United States Patent [19]

Karayannis et al.

[11] 4,222,893
[45] Sep. 16, 1980

[54] PROCESS FOR FORMING HIGH PERFORMANCE TITANIUM TRICHLORIDE OLEFIN POLYMERIZATION CATALYST COMPONENTS

[75] Inventors: Nicholas M. Karayannis; Harold Grams, both of Naperville, Ill.

[73] Assignee: Standard Oil Company (Indiana), Chicago, Ill.

[21] Appl. No.: 892,663

[22] Filed: Apr. 3, 1978

Related U.S. Application Data

[63] Continuation of Ser. No. 735,161, Oct. 26, 1976, abandoned.

[51] Int. Cl.² .................................................. C08F 4/64
[52] U.S. Cl. ............................ 252/429 B; 252/429 C; 526/142; 526/119; 526/127; 526/153; 526/158
[58] Field of Search ...................... 252/429 B; 423/492

[56] References Cited

U.S. PATENT DOCUMENTS

| 3,483,274 | 12/1969 | Bacskai | 252/429 B X |
| 3,984,350 | 10/1976 | Karayannis et al. | 252/429 B |
| 4,062,804 | 12/1977 | Ueno et al. | 252/429 B |
| 4,115,532 | 9/1978 | Yamaguchi et al. | 423/492 |
| 4,115,533 | 9/1978 | Yamaguchi et al. | 423/492 |
| 4,136,243 | 1/1979 | Appleyard et al. | 252/429 B X |

FOREIGN PATENT DOCUMENTS 721245 2/1973 South Africa ........................... 423/492

Primary Examiner—Patrick Garvin
Attorney, Agent, or Firm—Stephen L. Hensley; William T. McClain; William H. Magidson

[57] ABSTRACT

A process is described herein for improving the crystalline olefin polymerization yield and soluble polymer production of a high surface area, large porosity, brown catalyst component comprising beta titanium trichloride and some of at least one organic electron pair donor compound, which component is prepared by organoaluminum compound reduction of titanium tetrachloride followed by incorporation of the reduced solid with said donor compound and thereafter treatment with an electron pair acceptor compound. The improved process employs in the reduction a dialkylaluminum compound and a second material, which second material is subsequently substantially extracted prior to use of said component for polymerization.

8 Claims, No Drawings

PROCESS FOR FORMING HIGH PERFORMANCE TITANIUM TRICHLORIDE OLEFIN POLYMERIZATION CATALYST COMPONENTS

This is a continuation of application Ser. No. 735,161, filed Oct. 26, 1976, and now abandoned.

SUMMARY OF THE INVENTION

This invention relates to a process for improving the olefin polymerization performance of a high surface area, large porosity, brown catalyst component comprising beta titanium trichloride and some, up to about ten mol percent, of at least one organic electron pair donor compound made by reduction of titanium tetrachloride using an organo-aluminum compound followed by incorporation of the reduced solid with said donor compound and thereafter treatment with an electron pair acceptor compound, which improvement comprises using in the reduction an additional material that is subsequently substantially extracted prior to use of the component in polymerization and, more particularly, to an improved process for producing a high surface area, large porosity, brown olefin polymerization catalyst component comprising beta titanium trichloride and some, up to about ten mol percent, of at least one organic electron pair donor compound made by reduction of titanium tetrachloride using a dialkylaluminum compound, thereafter incorporating the solid reduction product with said donor compound and subsequently treating with titanium tetrachloride, which improved process involves using in the reduction a monoalkylaluminum compound along with said dialkylaluminum compound, said component of substantially improved polymerization yield and substantially improved ability to reduce formation of soluble polymer when used in alpha-olefin polymerization.

In accordance with the instant invention, an improved process is set forth for making a high surface area, large porosity, brown catalyst component comprising beta titanium trichloride and at least one organic electron pair donor compound selected from the group consisting of hydrocarbyl ethers, thioethers, ketones, esters, amides, amines, phosphines or stibines, which component is made by reduction of titanium tetrachloride with a lower alkyl, dialkylaluminum chloride reducing agent, subsequent incorporation of the resulting solid with said donor compound and thereafter treatment with titanium tetrachloride, which improved process involves using with said reducing agent up to about one mol of a lower alkyl, monoalkylaluminum dichloride for each mol of said dialkylaluminum chloride.

BACKGROUND OF THE INVENTION

In U.S. Pat. No. 3,984,350 a method of forming a high activity, low solubles producing, brown catalyst component comprising beta titanium trichloride is taught which has its prime utility in the polymerization of propylene and propylene dominated alpha-olefin mixtures when promoted with an alkylaluminum compound. Such component is a high surface area, large porosity material containing a small amount of one or more complexing agents. Although the component produces a large polymerization yield of crystalline polymer and a small solubles production compared to all prior art beta titanium trichloride catalyst components, further improvements can be of extreme commercial importance because of the size of yearly world production of such polymers. For example, even a few percent increase in crystalline polymer yield while maintaining the solubles level can produce savings in the millions of dollars per year range.

Now it has been found that if an additional material is added in the reduction, which is the first stage of producing the above-mentioned catalyst component, and, if such material is subsequently extracted by the organic electron pair donor material, the electron pair acceptor material, etc. prior to use as a catalyst component, a component of substantially increased crystalline polymer yield results which produces the same or slightly lower solubles.

STATEMENT OF THE INVENTION

The invention taught herein relates to a brown solid catalyst component comprising beta titanium trichloride and some, up to ten mol percent, of at least one organic electron pair donor compound selected from the group consisting of hydrocarbyl ethers, thioethers, thiols, ketones, esters, amides, amines, phosphines and stibines, preferably ethers, said component which is predominantly beta titanium trichloride having a surface area of above about eighty square meters per gram and a pore volume of above about one-tenth cubic centimeter per gram and combinations of such brown solid with an organoaluminum compound promoter, preferably a dialkylaluminum chloride, for the polymerization of alpha-olefins, preferably propylene.

The unimproved component in a preferred manner of preparation is made by (a) reacting titanium tetrachloride and a lower alkyl, dihydrocarbylaluminum halide, preferably a lower alkyl, alkylaluminum dichloride, in a mol ratio of about one mol titanium compound to one-half to three mols of aluminum compound at a temperature below about 0° C. in the presence of an inert liquid capable of dissolving said titanium tetrachloride; (b) raising the temperature of the product of (a) to less than about 100° C.; (c) incorporating the brown solid resulting from (b) in the presence of an inert liquid solvent for organic electron pair donor compound with at least one of said donor compounds selected from the group consisting of hydrocarbyl ethers, thioethers, thiols, ketones, esters, amides, amines, phosphines and stibines, preferably ethers, in a mol ratio within the range of about one-half to five mols of said donor compound per mol of titanium contained in said brown solid of (b); (d) heating the result between about ambient and about 80° C.; (e) treating the brown solid of (d) at a temperature between about 40° C. and about 100° C. with a solution in an inert liquid of an electron pair acceptor compound which is a titanium tetrahalide, a titanium alkoxyhalide, aluminum bromide, germanium tetrachloride or silicon tetrachloride, preferably titanium tetrachloride, at conditions of temperature, time, concentration of said acceptor compound dissolved in said inert liquid solvent, and mol ratio of acceptor compound to titanium contained in said brown solid of (d) which convert said brown solid of (d) into a brown solid having a surface area of above about eighty square meters per gram and a pore volume of above about 0.10 cc/gram; and (f) recovering from (e) a solid polymerization catalyst component comprising brown, beta titanium trichloride containing up to about ten mol percent of said at least one organic electron pair donor compound, said component having a surface area of above about eighty square meters per gram and a pore volume of above about 0.10 cc/gram. This component can be used with an organoaluminum compound promoter, particularly a lower alkyl, dialkylaluminum chloride, for the polymerization of alpha-olefins, particularly propylene.

The brown solid described herein preferably has a BET surface area larger than about fifty square meters per gram, more preferably, above about eighty square meters per gram and, most preferably, above about one hundred square meters per gram. The color, x-ray powder diffraction pattern and chloride to titanium ratio defines the inorganic portion of the brown solid as being substantially titanium trichloride in the beta crystalline modification. Porosity measurements on the brown solid show that it preferably has a pore volume of above about one-tenth cubic centimeter per gram, more preferably, above about fifteen-hundredths cubic centimeter per gram and, most preferably, above about twenty-hundredths cubic centimeter per gram.

Investigation of the morphology of the brown solid using electron microscopy shows the solid to be irregularly shaped but somewhat rounded particles which appear to be clusters of still smaller particles.

In a preferred embodiment the improved component is made by the improved process as described in the following few paragraphs.

Usefully, any substantially inert liquid medium is used for the preparative and washing steps in the preparation of the improved brown catalyst component. Alkanes such as pentane, hexane, cyclohexane and the like and halogenated compounds such as chlorobenzene and chloroalkanes may be used after suitable purification to remove water and other polar constituents such as alcohols, mercaptans, etc. More preferably, lower alkanes are the media used and, most preferably, hexane is used.

For the reduction of the titanium tetrachloride, a tri-(hydrocarbyl) aluminum or a di-(hydrocarbyl)aluminum halide is preferred, more preferably, a di-(hydrocarbyl)aluminum chloride may be used, and most preferably, a lower alkyl, alkylaluminum chloride such as diethylaluminum chloride is used. By lower alkyl is meant here an alkyl radical of from one to about eight carbon atoms.

Used also in the reduction is a second material, which second material is subsequently readily extractable prior to use of the component for polymerization. More preferably, the second material is a lower alkyl, monoalkylaluminum compound and, most preferably, it is a lower alkyl, alkylaluminum dichloride such as ethylaluminum dichloride.

The second material is used in conjunction with the hydrocarbylaluminum compound in preferably, an effective amount and, more preferably, in about a 0.5:1 mol ratio or larger, dialkylaluminum compound to said second material. Most preferably, it can be used in a mol ratio between about 0.5:1 and about 10:1. The second material should be present during at least a majority of the time that the solid reduction product is being formed for best incorporation into the brown reduction product.

The reduction temperature is best kept below about 0° C. while the titanium tetrachloride and organoaluminum compound or compounds are slowly admixed and it is generally maintained for a certain period thereafter. Preferably, admixing is accomplished with agitation. More preferably, a temperature between about −30° C. and about 0° C. is used and, most preferably, a temperature in the range of about −10° C. to about 0° C. is used.

The slurry formed by the reduction is thereafter briefly heated at a temperature up to 100° C., more preferably, up to about 80° C. By briefly is here meant more than a few minutes and less than several hours.

The amount of organoaluminum compound used varies with the amount of titanium tetrachloride used and preferably runs from about one mol titanium compound per one-half to three mols of aluminum compound. More preferably, the organoaluminum compound to titanium compound ratio varies from about 2:1 to about 0.5:1 and, most preferably, from about 1.5:1 to about 0.75:1.

The solid resulting from the reduction which is essentially a low surface area form of brown titanium trichloride containing small amounts of organoaluminum compounds, is preferably separated and briefly washed, and the result thereof is treated in an incorporation operation in the presence of an inert liquid medium with at least one organic, electron pair donor compound such as a hydrocarbyl ether, thioether, thiol, ketone, ester, amide, amine, phosphine or stibine. Preferably, said donor compound is a hydrocarbyl ether, thioether, thiol or ketone and, more preferably, said donor compound is an ether such as n-butyl, isobutyl, cyclohexyl, isopentyl or octyl ether and the like, or an ether in which the organic groups are of a mixed nature such as isobutylisopentyl ether, isopentylphenyl ether, etc. Most preferably, said donor compound is a lower alkyl ether, in particular a lower alkyl ether such as isopentyl ether or a mixture of isopentyl and n-butyl ethers. By lower alkyl is meant here alkyl groups having two to about eight carbon atoms.

In general, the reactants in the electron pair donor compound incorporation are added at about ambient temperature and the result thereof heated between about ambient and about 80° C. More preferably, the heating is accomplished at a temperature in the range from about 30° to about 70° C. and, most preferably, the heating is done at about 35° C. to about 50° C.

The amount of said organic electron pair donor compound which is added to the separated and washed solid from the first step preferably runs between about one-half to five mols of said donor compound per mol of titanium contained in said solid. More preferably, it varies between about seventy-five hundredths to two mols of said organic electron pair donor compound per mol of titanium contained in said solid, and, most preferably, the mol ratio can vary from about 0.9:1 to 1.5:1.

The heating period of the incorporation preferably varies between about ten minutes and a few hours with fifteen minutes to two hours being more preferred.

After the above treatment with said organic electron pair donor compound, the solid product from the incorporation is preferably separated and washed with an inert liquid medium.

The solid product resulting from such incorporation which is essentially a brown, low surface area form of titanium trichloride containing small amounts of organoaluminum compounds and some of the donor compound is then treated with an electron pair acceptor compound for a few minutes to a few hours, preferably fifteen minutes to several hours, in contact with an inert liquid medium. The temperature range of this heating varies from about ambient temperature to about 100° C., preferably about 30° C. to about 80° C., and, more preferably, about 40° C. to about 70° C.

The electron pair acceptor compound is preferably a Lewis acid which is soluble in the inert liquid medium such as titanium tetrahalide, titanium alkoxyhalide, aluminum bromide, germanium tetrachloride, silicon tetrachloride and other Periodic Group IVB, IVA and VA halides. More preferably, the electron acceptor pair compound is titanium tetrachloride, germanium tetrachloride or silicon tetrachloride, and, most preferably, it is titanium tetrachloride.

The process of treating the solid material from the incorporation with the electron pair acceptor compound in solution is preferably carried out using a mol ratio of said acceptor compound to titanium contained in said solid of about 10:1 to about 0.5:1. More preferably, it runs from a mol ratio of about 5:1 to about 0.5:1 and, most preferably, a mol ratio of about 3:1 to about 1:1 is used. It is important here not to use a highly concentrated solution of the electron pair acceptor compound. A five to thirty volume percent solution is preferable.

The high surface area, large porosity brown solid resulting from this treatment is then separated, preferably washed, and used in conjunction with an organoaluminum compound promoter such as an aluminum trialkyl or a dialkylaluminum halide, preferably a dialkylaluminum chloride, for polymerizing alpha-olefins. Preferably, a lower alkyl, dialkylaluminum chloride is used.

The catalyst combination of an organoaluminum compound and the brown solid may be used for slurry, bulk phase or vapor phase alpha-olefin polymerization with excellent results.

Although the catalyst component and organoaluminum compound are preferably used for propylene polymerization to form highly crystalline polypropylene it may be used for other $C_2$ to $C_{10}$ terminal olefins as well, e.g., ethylene, 1-butene, 1-pentene, 4 methyl-pentene-1, vinylcyclohexane, etc. and, additionally, for preparing highly crystalline, random, terminal block and pure block types of copolymers of propylene and a second alpha-olefin or propylene and ethylene.

The polymerization conditions of temperature, pressure and concentrations used for the catalyst combinations described herein are generally those known previously to or easily determined by those skilled in the art of alpha-olefin polymerization.

The solubles or extractables may be further reduced by modifying the instant catalyst combination with at least one modifier such as an amine, preferably a sterically hindered cyclic amine, an amine oxide, an ether, an organic phosphate, a polyether such as diglyme, etc. Mixtures of alkyltin sulfides such as bis-(tributyl)tin sulfide with an amine, amine oxide or organic phosphate or mixtures of hydrogen sulfide or sulfur dioxide with an amine, amine oxide or organic phosphite are also useful to further reduce solubles. The latter mixtures appear particularly good in reducing solubles with only a slight effect upon polymer yield.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

GENERAL EXPERIMENTAL PROCEDURE

All solvents and polymerization media used were treated to remove water and other polar materials prior to use herein.

The powder x-ray diffraction measurements were carried out on material in sealed glass tubes in the usual way using a diffractometer. Porosity measurements were made using an American Instrument Company, Silver Spring, Md., high pressure mercury porosimeter (60,000 p.s.i.).

Surface area measurements were accomplished employing the one point BET method using a ten percent nitrogen-ninety percent helium mixture. The sample was pretreated at ambient for about one hour in a slow stream of the above gas mixture, then cooled to liquid nitrogen temperature for about forty-five minutes for nitrogen adsorption and finally warmed to ambient and the composition of the desorbed gas measured with a thermal conductivity detector.

Polymerization activities are grams of crystalline polymer (total polymer minus solubles) per gram of brown solid per hour of polymerization.

EXAMPLE I

A 197 milliliter portion of dry hexane and 100 milliliters of titanium tetrachloride were added to a round bottom flask. The flask and its contents were protected under a blanket of dry nitrogen throughout the preparation. The solution was stirred with a magnetic stirring bar and cooled in an ice bath maintained at $-3°$ to $0°$ C. A 59 percent milliliter portion of diethylaluminum chloride in hexane (25 weight percent diethylaluminum chloride, solution density 0.74 grams/milliliter) was added dropwise to the titanium tetrachloride solution over a three hour period. After the alkyl addition was complete, the slurry was stirred at the same temperature for 15 minutes, fitted with a condenser, and then heated to $65°$ C. within one hour. The slurry was stirred at $65°$ C. for one hour. After cooling to room temperature, the solid was washed with five portions of dry hexane by decantation with the last wash performed at $65°$ C.

The solid was decanted, 1150 milliliters of dry hexane and 170 milliliter isopentyl ether added, and the slurry stirred at $35°$ C. for one hour. The solid was then washed with five portions of dry hexane by decantation.

A 20.3 volume percent stock solution of titanium tetrachloride in hexane (114 milliliters titanium tetrachloride plus 440 milliliters hexane) was added to the decanted solid. The slurry was stirred at $62°-65°$ C. for two hours and cooled to room temperature. The solid was washed with five portions of dry hexane by decantation with the last wash performed at $65°$ C. The solid was decanted and hexane added to give a stock slurry for polymerization tests.

EXAMPLE II

The procedure used was the same as in Example I except that (1) in the reduction 25 milliliters of titanium tetrachloride, 49 milliliters of hexane and 291 milliliters of EASC (ethylaluminum sesquichloride, $Et_3Al_2Cl_3$) were employed, (2) in the incorporation 288 milliliters of hexane and 51 milliliters of DIAE [isoamylether, $(i-Am)_2O$] were used, and (3) in the treatment 112 milliliters of hexane and 28.4 milliliters of titanium tetrachloride were employed.

EXAMPLE III

The procedure used was the same as in Example I except that (1) in the reduction 75 milliliters of titanium tetrachloride, 148 milliliters of hexane and 691 milliliters of a 25 weight percent in hexane alkyl solution (2/1 diethylaluminum chloride to ethylaluminum dichloride ratio) were employed, (2) in the incorporation 94 milliliters of hexane and 25.5 milliliters of DIAE were used, and (3) 56 milliliters of hexane and 14 milliliters of titanium tetrachloride were employed.

EXAMPLE IV

The procedure used was the same as in Example III except that in the incorporation 53 milliliters of hexane and 13.3 milliliters of DIAE were employed.

EXAMPLE V

The procedure used was the same as in Example III except that (1) 53 milliliters of hexane and 15.7 milliliters of DIAE were employed in the incorporation and (2) in the treatment 32 milliliters of hexane and 8 milliliters of titanium tetrachloride were employed.

EXAMPLE VI

The procedure used was the same as in Example V except that 56 milliliters of hexane and 14.2 milliliters of titanium tetrachloride were employed in the treatment.

EXAMPLE VII

The procedure used was the same as in Example II except that 56 milliliters of hexane and 14.5 milliliters of DIAE were used in the incorporation and 32 milliliters of hexane and 8 milliliters of titanium tetrachloride were employed in the treatment. Further, the reduction was a four times scale-up in amounts and a 47 milliliter portion of the slurry resulting from the reduction was employed.

EXAMPLE VIII

The procedure used was the same as in Example VII except that 50 milliliters of slurry from the reduction step were used instead of 47 milliliters.

EXAMPLE IX

The procedure used was the same as in Example II.

EXAMPLE X

The procedure used was a two times scale-up in amounts of Example II.

EXAMPLE XI

The procedure used was the same as in Example X.

EXAMPLE XII

The procedure used was the same as that used in Example X.

EXAMPLE XIII

The procedure used was the same as in Example I.

EXAMPLE XIV

The procedure used was a scale-down of Example I using one-quarter of the amounts.

EXAMPLE XV

The procedure used was the same as in Example II except that in the reduction 20 milliliters of hexane and 10 milliliters titanium tetrachloride were used. Further, the decanted solid was washed with two 100 milliliter portions of hexane, then 115 milliliters of hexane and 20.4 milliliters of DIAE were added. In the treatment 45 milliliters of hexane and 11.5 milliliters titanium tetrachloride were employed.

EXAMPLE XVI

The procedure used was the same as in Example XV except that the alkyl mixture used in the reduction was made by combining 21 milliliters of 25 weight percent DEAC (diethylaluminum chloride) and 77.7 milliliters of 25 weight percent EASC, both in hexane. Further, 19 milliliters of DIAE was added in the incorporation.

EXAMPLE XVII

The procedure used was the same as in Example XV.

EXAMPLE XVIII

The procedure used was the same as in Example XVI except that the alkyl mixture was made by combining 22 milliliters of DEAC and 38.8 milliliters of EASC, and 18 milliliters of DIAE were added in the incorporation.

EXAMPLE XIX

The procedure used was the same as in Example XV.

EXAMPLE XX

The procedure used was the same as in Example XV except that 63 milliliters of DEAC were employed in the reduction.

EXAMPLE XXI

The procedure used was the same as Example I except that (1) 50 milliliters of titanium tetrachloride, 98 milliliters of hexane and a 1:1 mixture of $Et_2AlCl$ and $i\text{-}BuAlCl_2$ in 94 milliliters of hexane was employed in the reduction, (2) 576 milliliters of hexane and 102 milliliters of DIAE was used in the incorporation, and (3) 224 milliliters of hexane and 56.8 milliliters of titanium tetrachloride were employed in the incorporation.

EXAMPLE XXII

The procedure used was the same as in Example XXI.

EXAMPLE XXIII

Propylene was polymerized using a slurry polymerization technique employing a pressure bottle. Polymerization conditions were 70° C., 40 psig propylene pressure, 200 milliliters of hexane and a two-hour run. The catalyst system was DEAC/brown solid at a 2.8/1 mol ratio.

TABLE

| Example No. | DEAC/EADC Ratio | DATE Ratio | Polymerization Activity wt/wt brown solid/hr) | Hexane Solubles (wt.%) |
|---|---|---|---|---|
| II | 1:1 | 2 | 306 | 2.8 |
|  | 1:1 | 2 | 328 | 2.8 |
| III | 2:1 | 2.2 | 251 | 4.7 |
| IV | 2:1 | 1.1 | 229 | 4.4 |
| V | 2:1 | 1.3 | 217 | 6.6 |
| VI | 2:1 | 1.3 | 232 | 4.7 |
| VII | 1:1 | 1.2 | 244 | 4.0 |
| VIII | 1:1 | 1.2 | 231 | 5.9 |
| IX | 1:1 | 1.2 | 252 | 3.9 |
| X | 1:1 | 1.2 | 276 | 2.3 |
|  | 1:1 | 1.2 | 306 | 2.2 |
| XII | 1:1 | 1.2 | 174 | 3.7 |
| XXI | 1:1* | 1.2 | 165** | 3.6 |
| XXII | 1:1* | 1.2 | 182** | 3.8 |
| COMPARATIVE POLYMERIZATIONS | | | | |
| I | 1:0 | 1 | 222 | 4.8 |
| XIII | 1:0 | 1 | 207 | 6.1 |

TABLE-continued

| Example No. | DEAC/EADC Ratio | DATE Ratio | Polymerization Activity wt/wt brown solid/hr | Hexane Solubles (wt.%) |
|---|---|---|---|---|
| XIV | 1:0 | 1 | 205 | 4.4 |

*i-BuAlCl₂ used instead of EADC
**Values are lower than maximum as a comparative example using EASC in the reduction gave a value of 174 g/g/hr - the reason for the lower values is unknown.

EXAMPLE XXIV

The polymerizations in this Example were carried out in the same conditions as in Example XXIII except that the catalyst employed was DEAC/brown solid/BTS*/COLL** at a 2.8/1/0.03/0.06 mol ratio.

TABLE

| Example No. | DEAC/EADC Ratio | DIAE Ratio | Polymerization Activity (wt/wt brown solid/hr) | Hexane Solubles (wt.%) |
|---|---|---|---|---|
| II | 1:1 | 2 | 294 | 0.8 |
|  | 1:1 | 2 | 326 | 1.0 |
| III | 2:1 | 2.2 | 254 | 1.4 |
| V | 2:1 | 1.3 | 211 | 1.7 |
| VI | 2:1 | 1.3 | 230 | 1.3 |
| VII | 1:1 | 1.2 | 235 | 1.1 |
| VIII | 1:1 | 1.2 | 229 | 1.1 |
| IX | 1:1 | 1.2 | 240 | 0.9 |
| X | 1:1 | 1.2 | 277 | 1.1 |
|  | 1:1 | 1.2 | 299 | 0.6 |
| XI | 1:1 | 1.2 | 239 | 1.7 |
|  | 1:1 | 1.2 | 233 | 0.7 |
| XII | 1:1 | 1.2 | 170 | 1.2 |
| XXI | 1:1*** | 1.2 | 164**** | 1.4 |
| XXII | 1:1*** | 1.2 | 176**** | 1.7 |
| COMPARATIVE EXAMPLES | | | | |
| I | 1:0 | 1 | 202 | 1.0 |
| XIII | 1:0 | 1 | 207 | 1.3 |
| XIV | 1:0 | 1 | 192 | 0.7 |

*BTS is bis-(tributyltin) sulfide
**COLL is 2,4,6-collidine
***i-BuAlCl₂ used instead of BADC
****Values are lower than maximum as a comparative example using EASC in the reduction gave a value of 174 g/g/hr - the reason for the lower values is unknown.

EXAMPLE XXV

The polymerization conditions used in this Example were the same as in Example XXIII.

TABLE

| Example No. | DEAC/EADC Ratio | DIAE Ratio | Polymerization Activity (wt/wt brown Solid/hr) | Hexane Solubles (wt.%) |
|---|---|---|---|---|
| XV | 1:1 | 1.2 | 199 | 3.5 |
| XVI | 1.5:1 | 1.12 | 191 | 3.3 |
| XVII | 1.5:1 | 1.12 | 214 | 3.0 |
| XVIII | 3:1 | 1.06 | 200 | 3.0 |
| XIX | 3:1 | 1.06 | 228 | 3.3 |
| COMPARATIVE EXAMPLE | | | | |
| XX | 1:0 | 1 | 132 | 4.5 |

EXAMPLE XXVI

In this comparative Example a violet titanium trichloride catalyst component was made according to Example 1 of South African Pat. No. 721,245 except that Et₃AlCl₃ was used instead of Et₂AlCl in the reduction.

EXAMPLE XXV

The polymerization conditions and technique were the same as in Example XXI.

| Example No. | Polymerization Activity (g/g violet solid/hr) | Hexane Solubles (wt.%) |
|---|---|---|
| * | 204 | 1.6 |
| * | 206 | 2.0 |
| * | 211 | 1.6 |
| * | 211 | 1.8 |
| XXIV | 218 | 1.4 |
| XXIV | 217 | 1.2 |

*Violet catalyst component made according to Example 1 of South African Patent No. 721,245.

What is claimed is:

1. In a process for preparing a brown solid comprising beta titanium trichloride and some, up to 10 mole percent, of at least one hydrocarbyl ether, said brown solid having a surface area above about eighty square meters per gram and a pore volume above about one-tenth cubic centimeter per gram and made by a process comprising
    (a) reducing titanium tetrachloride with a lower alkyl dihydrocarbylaluminum halide at a temperature below about 0° C.,
    (b) raising the temperature of the product of (a) to less than about 100° C.,
    (c) incorporating the solid product of (b) with at least one hydrocarbyl ether, and
    (d) thereafter treating the solid product of (c) with a solution in an inert liquid of an electron pair acceptor compound selected from the group consisting of titanium tetrachloride, titanium alkoxyhalide, aluminum bromide, germanium tetrachloride, silicon tetrachloride, and other periodic Group IVB, IVA, and VA halides under conditions of temperature, time, concentration of said acceptor compound dissolved in said inert liquid, and mole ratio of acceptor compound to titanium contained in the solid from (c) which convert said solid from (c) into a brown solid having a surface area of about eighty square meters per gram and a pore volume of about one-tenth cubic centimeters per gram,
the improvement wherein a lower alkyl alkylaluminum dihalide is employed in (a) in an amount such that the molar ratio of dihydrocarbylaluminum halide to alkylaluminum dihalide ranges from about 0.5:1 to about 10:1.

2. The process of claim 1 wherein said hydrocarbyl ether is at least one lower alkyl dialkyl ether and said acceptor compound is titanium tetrachloride.

3. The process of claim 2 wherein said alkylaluminum dihalide is an alkylaluminum dichloride.

4. The process of claim 3 wherein said dihydrocarbylaluminum halide is a dialkylaluminum chloride.

5. The process of claim 4 wherein the amount of said alkylaluminum dihalide in (a) is no larger than about one mol per mol of said dialkylaluminum chloride.

6. The process of claim 5 wherein said dialkylaluminum chloride is diethylaluminum chloride and said alkylaluminum dichloride is ethylaluminum dichloride.

7. The process of claim 1 wherein said electron pair acceptor compound is titanium tetrachloride.

8. The process of claim 6 wherein the conditions in (d) include a temperature of 62° to 65° C., a time of about 2 hours and a concentration of titanium tetrachloride in said inert liquid of about 20 volume %.

* * * * *

UNITED STATES PATENT OFFICE
CERTIFICATE OF CORRECTION

Patent No. 4,222,893  Dated September 16, 1980

Inventor(s) NICHOLAS M. KARAYANNIS and HAROLD GRAMS

It is certified that error appears in the above-identified patent and that said Letters Patent are hereby corrected as shown below:

PATENT

| Column | Line | |
|---|---|---|
| 5 | 48 | "organic phosphate" should be --organic phosphite-- |
| 8 | 53 | "DATE" (3rd column heading) should be --DIAE-- |
| 9 | 42 | "BADC" (3rd footnote below table) should be --EADC-- |

Signed and Sealed this

Eighteenth Day of August 1981

[SEAL]

Attest:

Attesting Officer

GERALD J. MOSSINGHOFF

Commissioner of Patents and Trademarks